United States Patent [19]

Shallenberger et al.

[11] Patent Number: 4,638,556
[45] Date of Patent: Jan. 27, 1987

[54] LOCKING TUBE INSERTION FIXTURE AND METHOD IN A RECONSTITUTABLE FUEL ASSEMBLY

[75] Inventors: John M. Shallenberger, Fox Chapel; Stephen J. Ferlan, Wilkins Twp., Allegheny County, both of Pa.

[73] Assignee: Westinghouse Electric Corp., Pittsburgh, Pa.

[21] Appl. No.: 689,696

[22] Filed: Jan. 8, 1985

[51] Int. Cl.⁴ .................. B23P 19/00; B23P 17/00; B23Q 13/14
[52] U.S. Cl. ......................... 29/723; 29/400 N; 269/48.1
[58] Field of Search ............. 29/157.3 C, 282, 281.4, 29/723, 400 N, 426.5; 269/48.1

[56] References Cited

U.S. PATENT DOCUMENTS

| | | | |
|---|---|---|---|
| 3,835,520 | 9/1974 | Sismore | 29/157.3 C |
| 3,986,383 | 10/1976 | Petteys | 269/48.1 |
| 4,065,953 | 1/1978 | Frentzen et al. | 269/48.1 |
| 4,321,111 | 3/1982 | Jabsen | 376/353 |
| 4,506,442 | 3/1985 | Alzmann et al. | 29/464 |

FOREIGN PATENT DOCUMENTS

| | | |
|---|---|---|
| 0098774 | 1/1984 | European Pat. Off. |
| 0109902 | 5/1984 | European Pat. Off. |
| 2420826 | 10/1979 | France |

*Primary Examiner*—Howard N. Goldberg
*Assistant Examiner*—Steven Nichols

[57] ABSTRACT

A fixture for inserting locking tubes into locking positions in a top nozzle includes a tool guide with operable devices for locking the guide to the top nozzle such that openings in the guide are aligned above passageways in the adapter plate of the top nozzle. Resiliently deformable sleeves are disposed in the respective guide openings for retaining locking tubes stationarily therein. Each sleeve includes a lower internal ledge which a bottom edge of the locking tube disposed therein rests and an inside diameter smaller than the outside diameter of the locking tube such that the tube is mounted in a stationary position within the sleeve and an interference fit is maintained between the sleeve and the tube. Further, the fixture includes a tool holder mounting tube insertion tools each in the form of an elongated cylindrical plunger rod having a lower cylindrical portion of smaller diameter than an upper cylindrical portion such that a bottom shoulder is formed on the upper portion. Also, the lower portion has an outside diameter and length which allows it to extend through the locking tube in the sleeve within one of the guide openings and enter into the upper end portion of one guide thimble, when the tool holder is moved toward the tool guide, before the bottom shoulder on the upper portion contacts the upper end of the locking tube and forces it from the sleeve and eventually pushes it into the one guide thimble upper end portion.

14 Claims, 4 Drawing Figures

FIG. 1

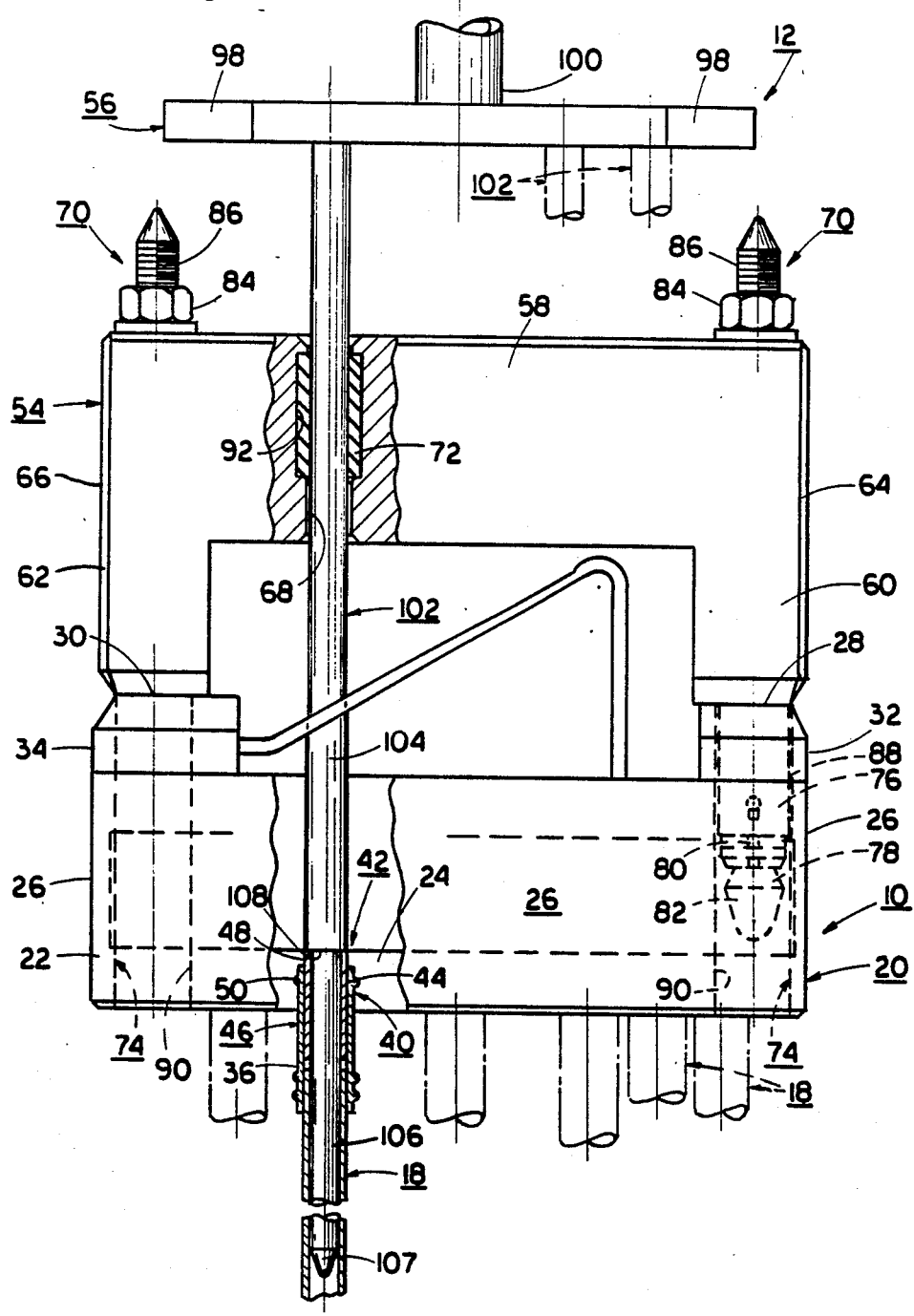

LOCKING TUBE INSERTION FIXTURE AND METHOD IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly with a Removable Top Nozzle" by John M. Shallenberger et al, assigned U.S. Ser. No. 644,758 and filed Aug. 27, 1984.

2. "Locking Tube Removal and Replacement Tool and Method in a Reconstitutable Fuel Assembly" by John M. Shallenberger et al, assigned U.S. Ser. No. 670,418 and filed Nov. 9, 1984.

3. "Top Nozzle Removal and Replacement Fixture and Method in a Reconstitutable Fuel Assembly" by John M. Shallenberger, assigned U.S. Ser. No. 670,729 and filed Nov. 13, 1984.

4. "Locking Tube Removal Fixture and Method in a Reconstitutable Fuel Assembly" by John M. Shallenberger, assigned U.S. Ser. No. 695,762 and filed Jan. 28, 1985.

BACKGROUND OF THE INVENTION

1. Field of the Invention

The present invention relates generally to fuel assemblies for nuclear reactors and, more particularly, is concerned with a fixture and method for inserting a locking tube into a locking position in a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles. Furthermore, due to vibration forces and the like, it is desirable to secure the locking tubes in their locking positions. For such purpose, suitable means, such as a pair of bulges, are formed in the upper portion of each locking tube after insertion in its locking position which bulges fit into the circumferential bulge in the upper end portion of the guide thimble.

Prior to removal of the top nozzle from, and after its replacement back on, the fuel assembly, the locking tubes must be removed from and replaced back at their locking positions. One tool for accomplishing either removal or replacement of each locking tube, individually or, in other words, one at a time, is illustrated and described in the second U.S. patent application cross-referenced above. However, it is believed that some customers may perceive the individual handling of locking tubes during reconstitution as posing a risk of tubes escaping and somehow becoming lost in the fuel assembly. This possibility is extremely remote since locking tubes are only handled and transported over a fuel assembly when the nozzle is mounted on the assembly, and no opening through the nozzle or in the annulus between the assembly and the work station is sufficiently large to allow passage of a dropped locking tube.

Notwithstanding the acceptable performance of the above-mentioned tool in removing and replacing locking tubes and the unlikelihood of losing a locking tube in the fuel assembly when using such tool, the possibility of customer concern over individual locking tube handling coupled with the desire to accomplish removal and replacement of the top nozzle in a shorter period of time have created a need for further improvement of the reconstitution operation so as to enhance commercial acceptance thereof.

SUMMARY OF THE INVENTION

The present invention together with other components, some of which comprise the invention disclosed and claimed in the third and fourth U.S. patent applications cross-referenced above, are designed to satisfy the aforementioned needs by improving a system of remotely-operated, submersible equipment operable to remove and subsequently remount or replace the locking tubes and top nozzle of a reconstitutable fuel assembly, such as the one disclosed in the first U.S. patent application cross-referenced above, at a reactor plant. After the locking tubes and top nozzle have been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles and the locking tubes replaced in their locking positions.

The present invention provides a fixture and method for inserting, that is, remounting or replacing, the locking tubes into their locking positions in the removable top nozzle of the reconstitutable fuel assembly. Furthermore, the locking tubes are handled, in any number ranging from a single one to many, in a captive manner which ensures that none can become lost during return to their specified position within the fuel assembly. Preferably, the present invention and that of the fourth cross-referenced application respectively make possible the simultaneous insertion and removal of a full complement of locking tubes and accomplish the handling of the tubes so as to preclude their inadvertent escape during reconstitution operations over a fuel assembly in a repair work station. In so doing, a more efficient reconstitution operation with substantially less risk of mishap during handling of the locking tubes is provided.

Accordingly, the present invention sets forth for use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a fixture and method for inserting the locking tube into its locking position in the top nozzle.

The fixture for inserting the locking tube includes: (a) a tool guide having at least one opening; (b) means for releasably locking the tool guide on the top nozzle so as to align the opening of the guide with the passageway of the top nozzle adapter plate; (c) means disposed within the opening of the tool guide and being adapted to releasably retain a locking tube therein in alignment with the upper end portion of the guide thimble being positioned within the passageway of the top nozzle adapter plate; (d) a tool holder; and (e) at least one tube insertion tool mounted on the tool holder and having (i) first means being extendable through the guide opening and the locking tube and into the upper end portion of the guide thimble, and (ii) second means being engagable with the locking tube for causing release thereof from the locking tube retaining means and insertion thereof into the guide thimble upper end portion, upon movement of the tool holder toward the top nozzle and tool guide locked thereon and of the tool therewith through the opening of the tool guide.

More particularly, the locking tube retaining means is in the form of a resiliently deformable sleeve having an internal lower edge upon which the bottom edge of the locking tube rests and an inside diameter smaller than the outside diameter of the locking tube such that the tube is mounted in a stationary position within the sleeve and an interference fit is maintained between the sleeve and tube which provides additional assurance that the tube cannot inadvertently escape therefrom. Also, the first and second means of the insertion tool are in the form of lower and upper cylindrical portions of an elongated plunger rod. The lower rod portion has an outside diameter and length which allows it to extend through the locking tube in the retaining sleeve in the tool guide and enter into the upper end portion of the guide thimble, when the tool holder is moved toward the tool guide, before a bottom shoulder formed on the upper rod portion contacts the upper end of the locking tube. The upper rod portion, which has an outside diameter greater than the lower rod portion and the inside diameter of the locking tube, forces the locking tube out of the retaining sleeve and eventually pushes it into the guide thimble upper end portion positioned within the adapter plate passageway, as movement of the tool holder is continued toward the tool guide.

The method for inserting the locking tube includes the operative steps of: (a) releasably disposing a locking tube within an opening in a tool guide; (b) locking the tool guide on the top nozzle so as to align its opening with the passageway of the top nozzle adapter plate and the locking tube disposed within the opening in alignment with the upper end portion of the guide thimble positioned within the passageway; and (c) moving a tool holder having a tube insertion tool mounted thereon toward the tool guide so as initially to cause the tool to extend through the guide opening and locking tube and into the upper end portion of the guide thimble and thereafter to engage the locking tube causing its release from the tool guide opening and insertion into the guide thimble upper end portion to its locking position therein.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is a fragmentary side elevational view similar to that of FIG. 1, but showing the fixture after insertion of a locking tube in the top nozzle of the reconstitutable fuel assembly.

DETAILED DESCRIPTION OF THE INVENTION

Figure 1:
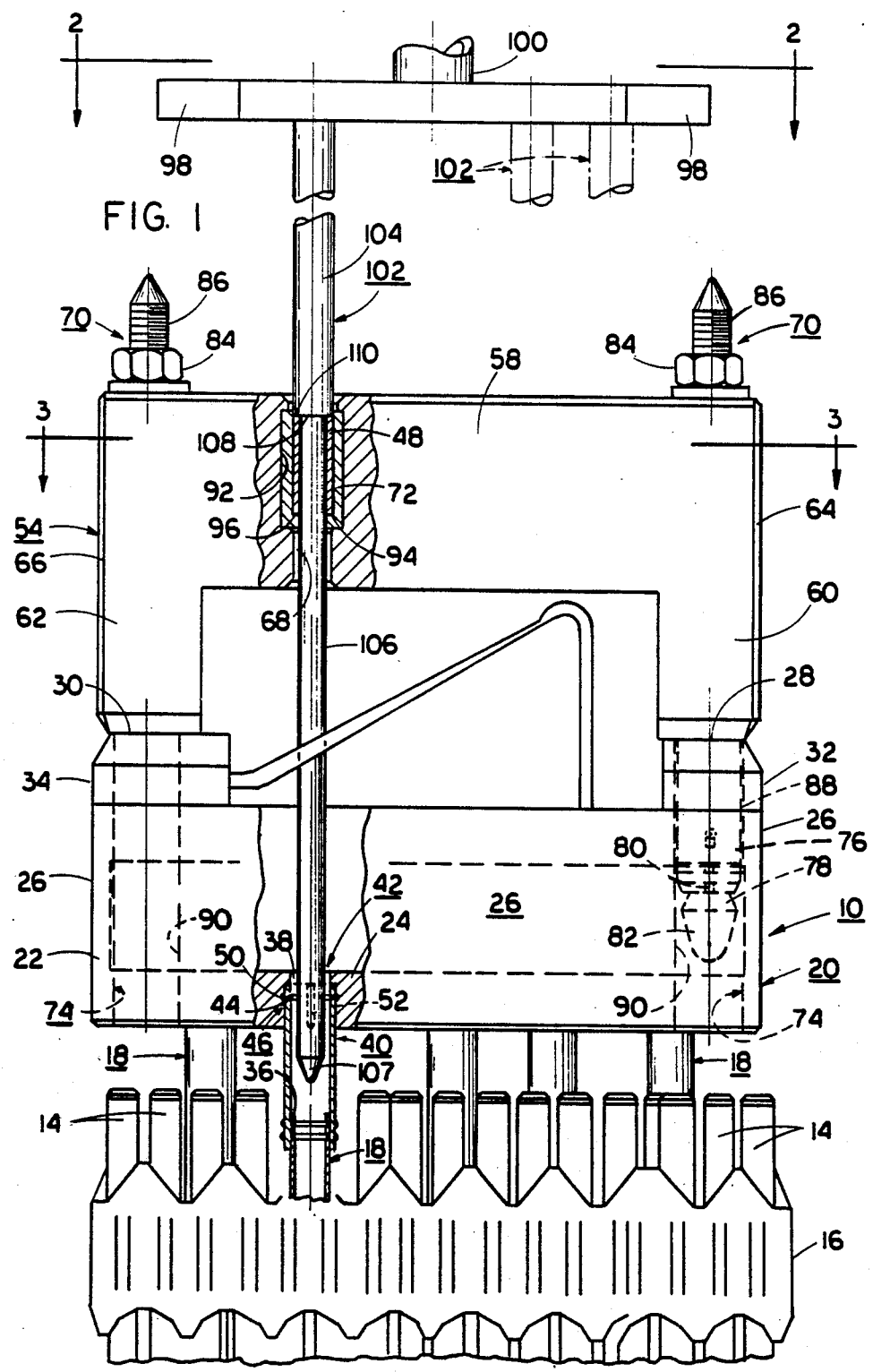
FIG. 1 is a fragmentary side elevational view of the upper end of a reconstitutable fuel assembly, with parts partially sectioned and broken away for purposes of clarity, and of the fixture of the present invention employed in inserting the locking tubes in the top nozzle of the assembly, with the fixture being shown prior to insertion of a locking tube in the top nozzle.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an upper end of a reconstitutable fuel assembly, being generally designated by the numeral 10, on which a locking tube insertion fixture of the present invention, generally indicated at 12, and a top nozzle removal and replacement fixture (not shown) and a locking tube removal fixture (not shown), which respectively form the inventions of the third and fourth cross-referenced patent applications, are employed.

Basically, the fuel assembly 10, being of conventional construction, includes an array of fuel rods 14 held in spaced relationship to one another by a number of grids 16 (only one being shown) spaced along the fuel assembly length. Each fuel rod 14 includes nuclear fuel pellets (not shown) and is sealed at its opposite ends. The fuel pellets composed of fissile material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The reconstitutable fuel assembly 10 also includes a number of longitudinally extending guide tubes or thimbles 18 along which the grids 16 are spaced and to which they are attached. The opposite ends of the guide thimbles 18 extend a short distance past the opposite ends of the fuel rods 14 and are attached respectively to a bottom nozzle (not shown) and a top nozzle 20.

To control the fission process, a number of control rods (not shown) are reciprocally movable in the guide thimbles 18 located at predetermined positions in the fuel assembly 10. Specifically, the top nozzle 20 includes a rod cluster control mechanism (not shown) interconnected to the control rods and operable to move the control rods vertically in the guide thimbles 18 to thereby control the fission process in the fuel assembly 10, all in a well-known manner.

As illustrated in FIG. 1, the top nozzle 20 comprises a housing 22 having a lower adapter plate 24 surrounded by four interconnected, upstanding side walls 26 with raised sets of pads 28,30 (only one pad in each set being shown) located respectively at pairs of diagonal corners 32,34 formed by the side walls 26. The control rod guide thimbles 18 have their uppermost end portions 36 coaxially positioned within control rod passageways 38 formed through the adapter plate 24 of the top nozzle 20. For gaining access to the fuel rods 14, the adapter plate 24 of the top nozzle 20 is removably connected to the upper end portions 36 of the guide thimbles 18 by an attaching structure, generally designated 40. The attaching structure 40 will be described herein to the extent necessary to facilitate an understanding of the structure and operation of the locking tube insertion fixture 12 comprising the present invention. However, a more thorough understanding of the attaching structure 40 can be gained from the first patent application cross-referenced above, the disclosure of which is incorporated herein by reference.

TOP NOZZLE ATTACHING STRUCTURE

As partly seen in FIG. 1, and better seen in FIG. 4, the attaching structure 40 of the reconstitutable fuel assembly 10 includes a plurality of outer sockets 42 (only one being shown) defined in the top nozzle adapter plate 24 by the plurality of passageways 38 which each contain an annular circumferential groove 44 (only one being shown), a plurality of inner sockets 46 (only one being shown) defined on the upper end portions 36 of the guide thimbles 18, and a plurality of removable locking tubes 48 (only one being shown also) inserted in the inner sockets 46 to maintain them in locking engagement with the outer sockets 42. Each inner socket 46 is defined by an annular circumferential bulge 50 on the hollow upper end portion 36 of one guide thimble 18. A plurality of elongated axial slots 52 (only one being shown) are formed in the upper end portion 36 of each guide thimble 18 to permit inward elastic collapse of the slotted end portion to a compressed position so as to allow the circumferential bulge 50 thereon to be inserted within and removed from the annular groove 44 via the adapter plate passageway 38. The annular bulge 50 seats in the annular groove 44 when the guide thimble end portion 36 is inserted in the adapter plate passageway 38 and has assumed an expanded position. In such manner, the inner socket 46 of each guide thimble 20 is inserted into and withdrawn from locking engagement with one of the outer sockets 42 of the adapter plate 24.

The locking tubes 48 of the attaching structure 40 are inserted from above the top nozzle 20 into their respective locking positions in the hollow upper end portions 36 of the guide thimbles 18 forming the inner sockets 46. When each locking tube 48 is inserted in its locking position, it retains the bulge 50 of the inner socket 46 in the latter's expanded locking engagement with the annular groove 44 and prevents the inner socket 46 from being moved to its compressed releasing position in which it could be withdrawn from the outer socket 42. In such manner, the locking tubes 48 maintain the inner sockets 46 in locking engagement with the outer sockets 42, and thereby the attachment of the top nozzle 20 on the upper end portions 36 of the guide thimbles 18.

Ordinarily, the locking tubes 48 are dimensioned to have a tight frictional fit with the side-walls of the adapter plate passageways 38 for maintaining the tubes 48 in their locking positions. However, due to vibrational forces and the like, it is sometimes desirable to secure the locking tubes 48 in their locking positions. For such purposes, suitable means, such as a pair of dimples or bulges (not shown), are formed in the upper portion of each locking tube 48 after insertion to its locking position. The bulges fit into the circumferential bulge 50 in the upper end portion 36 of the guide thimble 18.

FIXTURE FOR INSERTING LOCKING TUBES

For effectuating inspection, removal, replacement and/or rearrangement of fuel rods 14 contained in the reconstitutable fuel assembly 10, the assembly must be removed from the reactor core and lowered into a work station (not shown) by means of a standard fuel assembly handling tool (not shown). In the work station, the fuel assembly is submerged in coolant and thus maintenance operations are performed by manipulation of remotely-controlled submersible equipment. One component of such equipment is the fixture (not shown) forming the invention illustrated and described in the fourth patent application cross-referenced above which is useful for removing the locking tubes 48 as a first step in removing the top nozzle 20 from the reconstitutable fuel assembly 10. Another component of such equipment is the fixture (not shown) forming the invention illustrated and described in the third patent application cross-referenced above which, after the locking tubes 48 have been removed, is used for removing and subsequently replacing the top nozzle 20 from and on the guide thimbles 18 of the reconstitutable fuel assembly 10. Still another component of such equipment is the fixture 12 of the present invention for inserting (remounting or replacing) the locking tubes 48 in their locking positions after the top nozzle 20 has been replaced on the fuel assembly 10.

Referring again to FIG. 1, there is shown the fixture 12 useful in inserting the locking tubes 48 in their locking positions within the top nozzle 20. The fixture 12 basically includes a tool guide 54 and a tool holder 56 which is moved relative to the guide 54 for causing insertion of the locking tubes 48.

The tool guide 54 has a thick central plate 58 supported by sets of pedestals 60,62 (see also FIG. 2) located respectively at pairs of diagonal corners 64,66 of the central plate 58. Also referring to FIG. 3, the central plate 58 of the tool guide 54 has a generally rectangular configuration and a plurality of openings 68 defined therethrough and arranged in a pattern identical to that of the passageways 38 in the adapter plate 24 of the top nozzle 20. When the tool guide 54 is locked in its desired position for locking tube insertion on the top nozzle 20 by releasable locking means in the form of a pair of releasable expansion members 70, its openings 68 are aligned above the respective passageways 38 of the top nozzle 20. Within each of the openings 68 is disposed means 72 for retaining one locking tube 48 in alignment with the upper end portion 36 of one of the guide thimbles 18 positioned within each of the passageways 38 of the top nozzle adapter plate 24.

More specifically, for locking the tool guide 54 on the top nozzle 20, each of the releasable expansion members 70 at the diagonal corners 64 of the tool guide mate with one of a pair of bores 74 defined in the pair of diagonal raised corner pads 28 of the top nozzle 20. Each expansion member 70 includes a hollow expandable split sleeve 76 fixedly mounted below each pedestal 60 in the diagonal corner 64 and a wedge pin 78 inserted into the split sleeve 76 from the lower end. The lower end portion of the split sleeve 76 contains several axially extending slots 80 which are expandable circumferentially outward when an enlarged conical head 82 on the lower end of the wedge pin 78 is drawn in an upward axial direction by tightening nut 84 on the threaded upper end 86 of the pin 78. Expansion of the split sleeve 76 creates a tight friction fit between its outer surface 88 and the internal surface 90 of the bore 74 which locks the tool guide 54 to the top nozzle 20.

Each of the locking tube retaining means 72 takes the form of a cylindrical resiliently deformable sleeve captured within an annular recess 92 formed within the central plate 58 of the tool guide 54 about each of the openings 68 extending there-through. Preferably, the sleeve 72 is made from a polyurethane elastomer. As seen in FIG. 1, the sleeve 72 has an inside diameter smaller than the diameter of the opening 68 and also an internal lower annular ledge 94 upon which the locking tube 48 rests at its bottom edge 96. The inside diameter of the sleeve 72 is also smaller than the outside diameter of the locking tube 48 disposed within the sleeve such that an interference fit is maintained between the sleeve 72 and the tube 48. The presence of the sleeve ledge 94 and the interference fit of the tube 48 and sleeve 72 ensures that the tube 48 is held in a stationary position within the sleeve 72 until it is positively forced therefrom in a manner to be explained shortly.

Figure 2:
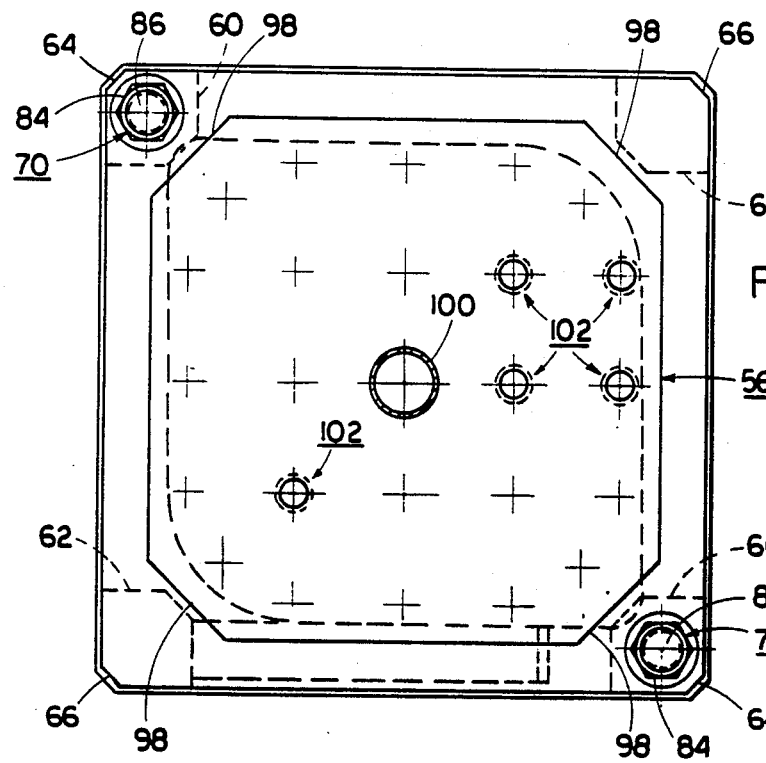
FIG. 2 is a top plan view of the fixture as seen along line 2—2 of FIG. 1 in the direction of the arrows, showing the tool holder of the fixture.

Referring again to FIG. 1, and also to FIG. 2, the tool holder 56 of the fixture 12 has a generally rectangular configuration with notched corners 98 to accommodate the upper ends 86 of the expansion member pins 78 when the holder 56 is disposed near the tool guide 54. Means 100 in the form of an elongated pipe is connected to the center of the tool holder 56 for use at a remote location in moving the holder toward and away from the tool guide 54.

Figure 3:
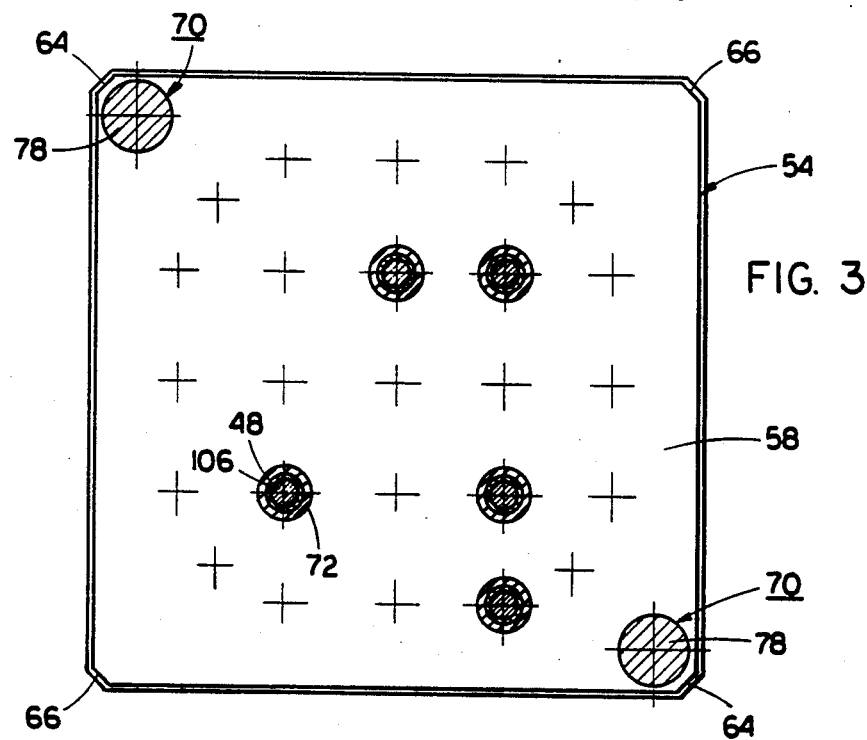
FIG. 3 is a sectional view of the upper portion of the tool guide of the fixture as taken along line 3—3 of FIG. 1, showing the locking tubes disposed in the respective retaining sleeves and the insertion tool rods of the fixture extending through the locking tubes.

A plurality of locking tube insertion tools, generally designated 102, are mounted to the tool holder 56 and extend downwardly therefrom. Only one of the tools 102 is illustrated in full form in FIGS. 1 and 4, with several others being shown in fragmentary form. However, it is to be understood that this has been done for purpose of clarity only since the other tools are identical to the illustrated one, and thus the illustration of one of the tools 102 will suffice for all. It is to be presumed that in the preferred embodiment of the fixture 12, a full complement of tools 102 equal in number to that of the locking tubes 48 would most advantageously be used. Further, the tools 102, as depicted in FIG. 2, are arranged in a pattern identical to that of the openings 68 in the tool guide 54, as represented in FIG. 3.

Each of the locking tube insertion tools 102 takes the form of a cylindrical plunger rod having an upper cylindrical portion 104 and a lower cylindrical portion 106. The lower portion 106 has an outside diameter which is smaller than the outside diameter of the upper portion 104 so as to form a bottom shoulder 108 at the transition between the lower and upper rod portions 106,104. Also, the outside diameter of the lower rod portion 106 is smaller than the inside diameter of each locking tube 48, whereas the outside diameter of the upper rod portion 104 is larger than the inside diameter of each locking tube 48 but smaller than the diameter of each tool guide opening 68. Further, as depicted in FIG. 1, the length of the lower rod portion 106 is sufficient to allow it to extend through the locking tube 48 retained in one of the sleeves 72 and also enter into the upper end portion 36 of one of the guide thimbles 18 positioned in one of the adapter plate passageways 38, before the bottom shoulder 108 on the upper rod portion 104 contacts the upper end 110 of the locking tube 48 so as to force it from the sleeve 72.

The procedure for installing the locking tubes 48 after the top nozzle 20 has been remounted on the upper end portions 36 of the guide thimbles 18 is as follows. With a full complement of locking tubes 48 loaded in the deformable sleeves 72 disposed within the through-openings 68 of the tool guide 54, by using a long-handled tool the guide is lowered (not shown) onto the top nozzle 20 into a position in which the expansion members 70 are inserted within the corner bores 74. Another long-handled tool (not shown) is used to connect with the upper ends 86 of the wedge pins 78 and rotate the same so as to lock the tool guide 54 on the top nozzle 20.

The tool holder 56 supported on still another long-handled tool having as a part thereof the pipe 100 is then lowered toward the tool guide 54 so as to guide the conical heads 107 on the bottom ends of the lower portions 106 of the locking tube insertion tool rods 102 into the corresponding through-openings 68 containing the sleeves 72 with the locking tubes 48 therein. The outside diameter of the lower rod portions 106 allows them to freely pass through the locking tubes 48. Furthermore, as seen in FIG. 1, the lower rod portions 106 are sufficiently long to allow the conical heads 107 thereon to enter the guide thimble upper ends 36 in the adapter plate passageways 38 before the shoulder 108 on each insertion tool rod 102 contacts the locking tube 48.

Further downward travel of the tool holder 56 simultaneously forces all of the locking tubes 48 out of the respective retaining sleeves 72 in the tool guide 54. When the tubes 48 are beyond the sleeves 72, they remain captured on the rods 102 and fall to the top surface of the adapter plate 24 at the entrance to the passageways 38 therein. The upper portions 104 of the insertion tool rods 102 follow the tubes 48 downward with the shoulders 108 thereon pushing the tubes 48 ahead and into the upper end portions 36 of the guide thimbles 18. Once the shoulders 108 are flush with the top surface of the adapter plate 24, as seen in FIG. 4, the locking tubes 48 have then been properly installed in their locking positions in the guide thimble upper end portions.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a fixture for inserting the locking tube into its locking position, comprising:
   (a) a tool guide having at least one opening;
   (b) means for releasably locking said tool guide on said top nozzle so as to align said opening of said guide with said passageway of said top nozzle adapter plate;
   (c) means disposed within said opening of said tool guide and being adapted to releasably retain said locking tube therein in alignment with said upper end portion of said guide thimble being positioned within said passageway of said top nozzle adapter plate;
   (d) a tool holder; and
   (e) at least one locking tube insertion tool mounted on said tool holder and having
      (i) first means being extendable through said guide opening and said locking tube and into said upper end portion of said guide thimble, and
      (ii) second means being engagable with said locking tube for causing release thereof from said locking tube retaining means and insertion thereof into said guide thimble upper end portion, upon movement of said tool holder toward said top nozzle and said tool guide locked thereon and of said tool therewith through said opening of said tool guide.

2. The fixture as recited in claim 1, wherein said locking tube retaining means is in the form of a resiliently deformable sleeve having an internal lower annular ledge upon which a bottom edge of said locking tube rests such that said tube is mounted in a stationary position within said sleeve.

3. The fixture as recited in claim 1, wherein said locking tube retaining means is in the form of a resiliently deformable sleeve having an inside diameter smaller than the outside diameter of said locking tube such that an interference fit is maintained between said sleeve and tube for holding said tube in a stationary position within said sleeve.

4. The fixture as recited in claim 3, wherein said sleeve is made from a polyurethane elastomer.

5. The fixture as recited in claim 1, wherein:
   said locking tube insertion tool is in the form of an elongated cylindrical plunger rod;
   said first means of said insertion tool is in the form of a lower cylindrical portion of said rod having an outside diameter smaller than an inside diameter of said locking tube;
   said second means of said insertion tool is in the form of an upper cylindrical portion of said rod having an outside diameter smaller than the diameter of said tool guide opening and larger than an outside diameter of said locking tube and said outside diameter of said lower rod portion so as to form a bottom shoulder at a transition between said lower and upper rod portions; and
   said lower rod portion being of a length sufficient to allow it to extend through said locking tube in said retaining means within said tool guide and enter into said upper end portion of said guide thimble, when said tool holder is moved toward said tool guide, before said bottom shoulder on said upper rod portion contacts an upper end of said locking tube and forces said locking tube from said retaining means and into said upper end portion of said guide thimble.

6. The fixture as recited in claim 1, wherein said releasable locking means includes a pair of hollow expandable split sleeves fixedly mounted in a pair of opposite diagonal corners of said tool guide and a pair of wedge pins mounted for axial movement in said respective sleeves, said sleeves being insertable within respective bores defined in a pair of opposite diagonal corners of said top nozzle such that when so inserted and said wedge pins are moved in a first direction said sleeves expand into frictional engagement with said bores and secure said tool guide to said top nozzle, whereas when said wedge pins are moved in a second, opposite direction said sleeves contract and release their frictional engagement with said bores allowing removal of said tool guide from said top nozzle.

7. For use with a reconstitutable fuel assembly including a top nozzle with an adapter plate having a plurality of passageways, a plurality of guide thimbles with upper end portions and an attaching structure having hollow locking tubes for releasably locking the upper end portions of the guide thimbles within the passageways of the top nozzle adapter plate, a fixture for inserting the locking tubes into their locking positions, comprising:
(a) a tool guide having a plurality of openings arranged in a pattern identical to that of said passageways in said top nozzle adapter plate;
(b) means for releasably locking said tool guide on said top nozzle so as to align said openings of said guide above said passageways of said top nozzle adapter plate;
(c) a plurality of resiliently deformable sleeves each being disposed in said tool guide within one of said openings therein and adapted to releasably retain one of said locking tubes therein in alignment with said upper end portion of one of said guide thimbles being positioned within a corresponding one of said passageways of said adapter plate;
(d) a tool holder;
(e) a plurality of locking tube insertion tools mounted to said tool holder, and extending downwardly therefrom, in a pattern identical to that of said openings in said tool guide; and
(f) means for moving said tool holder toward and away from said tool guide when locked on said top nozzle for causing release of said locking tubes from said sleeves in said tool guide and insertion of said tubes in said upper end portions of said guide thimbles.

8. The fixture as recited in claim 7, wherein said releasable locking means includes a pair of hollow expandable split sleeves fixedly mounted in a pair of opposite diagonal corners of said tool guide and a pair of wedge pins mounted for axial movement in said respective sleeves, said sleeves being insertable within respective bores defined in a pair of opposite diagonal corners of said top nozzle such that when so inserted and said wedge pins are moved in a first direction said sleeves expand into frictional engagement with said bores and secure said tool guide to said top nozzle, whereas when said wedge pins are moved in a second, opposite direction said sleeves contract and release their frictional engagement with said bores allowing removal of said tool guide from said top nozzle.

9. The fixture as recited in claim 7, wherein said each locking tube insertion tool includes first means being extendable through one of said guide openings and said locking tube disposed therein by one of said sleeves and into said upper end portion of one of said guide thimbles, and second means being engagable with said locking tube for causing release thereof from said one sleeve and insertion thereof into said one guide thimble upper end portion, upon movement of said tool holder toward said top nozzle and said tool guide locked thereon and of said tools therewith through said openings of said tool guide.

10. The fixture as recited in claim 9, wherein:
each of said locking tube insertion tools is in the form of an elongated cylindrical plunger rod;
said first means of each said insertion tool is in the form of a lower cylindrical portion of said rod having an outside diameter smaller than an inside diameter of each said locking tube;
said second means of each said insertion tool is in the form of an upper cylindrical portion of said rod having an outside diameter smaller than the diameter of each said tool guide opening and larger than an outside diameter of each said locking tube and said outside diameter of said lower rod portion so as to form a bottom shoulder at a transition between said lower and upper rod portions; and
said lower portion of each said rod being of a length sufficient to allow it to extend through said locking tube in one of said sleeves within said tool guide and enter into said upper end portion of one of said guide thimbles, when said tool holder is moved toward said tool guide, before said bottom shoulder on said upper portion of each said rod contacts an upper end of said locking tube and forces said locking tube from said one sleeve and into said upper end portion of said one guide thimble.

11. The fixture as recited in claim 7, wherein each of said sleeves has an internal lower annular ledge upon which a bottom edge of said one locking tube disposed therein rests such that said tube is mounted in a stationary position within said sleeve.

12. The fixture as recited in claim 7, wherein each of said sleeves has an inside diameter smaller than the outside diameter of said one locking tube disposed therein such that an interference fit is maintained between said sleeve and tube for holding said tube in a stationary position within said sleeve.

13. The fixture as recited in claim 12, wherein each of said sleeves is made from a polyurethane elastomer.

14. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a method for inserting the locking tube into its locking position, comprising the steps of:
(a) releasably disposing a locking tube within an opening in a tool guide;
(b) locking the tool guide on the top nozzle so as to align its opening with the passageway of the top nozzle adapter plate and the locking tube disposed within the opening in alignment with the upper end portion of the guide thimble positioned within the passageway; and
(c) moving a tool holder having a locking tube insertion tool mounted thereon toward the tool guide so as initially to cause the tool to extend through the guide opening and locking tube and into the upper end portion of the guide thimble and thereafter to engage the locking tube causing its release from the tool guide opening and insertion into the guide thimble upper end portion to its locking position therein.

* * * * *